United States Patent
Haverinen

(10) Patent No.: US 6,357,735 B2
(45) Date of Patent: Mar. 19, 2002

(54) FIXTURE

(76) Inventor: Jouko Haverinen, Fänkålsgatan 11, 424 43 Angered (SE)

(*) Notice: Subject to any disclaimer, the term of this patent is extended or adjusted under 35 U.S.C. 154(b) by 0 days.

(21) Appl. No.: 09/748,840

(22) Filed: Dec. 26, 2000

Related U.S. Application Data

(63) Continuation of application No. PCT/SE99/00973, filed on Jun. 7, 1999.

(30) Foreign Application Priority Data

Jun. 26, 1998 (SE) .............................. 9802274

(51) Int. Cl.$^7$ ................................. B25B 1/20
(52) U.S. Cl. .......................... 269/43; 269/900; 269/49; 269/58; 29/271
(58) Field of Search ............... 269/43, 44, 47, 269/49, 58, 900; 29/271, 281.5

(56) References Cited

U.S. PATENT DOCUMENTS

| | | | |
|---|---|---|---|
| 2,080,906 A | * 5/1937 | Boyer | 29/272 |
| 4,701,989 A | 10/1987 | Cayzer | |
| 5,052,608 A | * 10/1991 | McClure | 29/272 |
| 5,228,151 A | * 7/1993 | Ingle | 29/272 |
| 5,573,229 A | * 11/1996 | Lycan | 269/43 |

* cited by examiner

Primary Examiner—Joseph J. Hail, III
Assistant Examiner—Lee Wilson
(74) Attorney, Agent, or Firm—D. Peter Hochberg; Katherine R. Vieyra; William H. Holt

(57) ABSTRACT

The present invention relates to a flange fixture intended to hold a flange to a tube for welding the flange to the tube, whereby it comprises: a) a cylindrical central body comprising at least three evenly distributed expansion holders as well as one cylindrical part provided with threads, whereby the expansion holders are each arranged to receive at least a radially movable expansion mechanism, and whereby the cylindrical part being provided with threads is arranged to receive one controlling device influencing the radially movable expansion mechanism for obtaining an outwardly directed movement; b) a first cylindrical shaft axially and rotatably mounted arranged in the central body and comprising a second controlling device arranged in the end thereof facing away from the central body; c) an axially and rotatably arranged second shaft in the shaft, which second shaft in its end receives at least three evenly distributed second expansion holders, which are each arranged to receive at least one radially moveable second expansion mechanism, whereby the second controlling device is arranged to influence the second expansion mechanism for obtaining an outwardly radially directed movement; and d) at least one device for checking the influence of the respective controlling device for radially outwardly directed movement of the respective expansion mechanism.

10 Claims, 2 Drawing Sheets

FIXTURE

Figure 1:
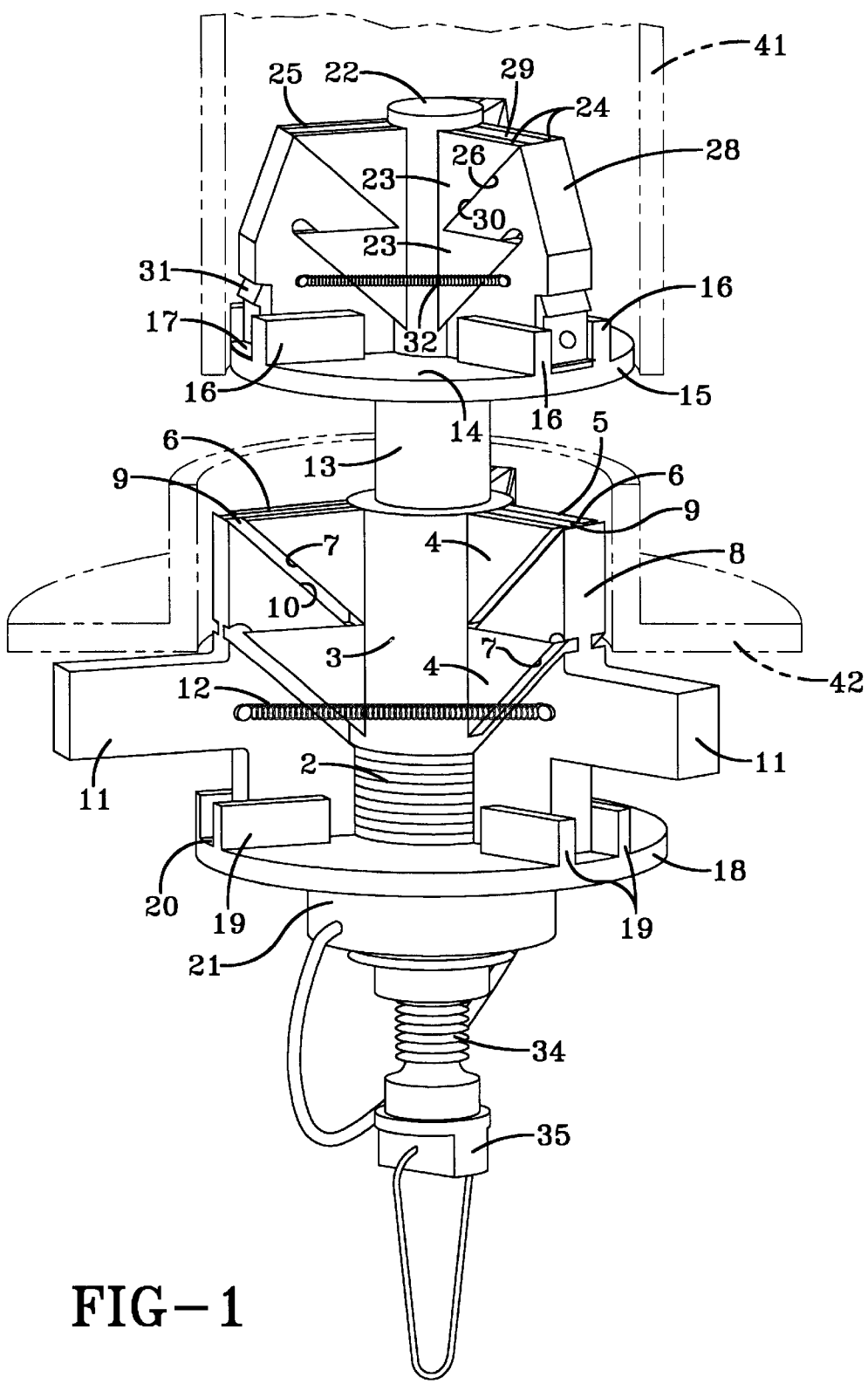

This is a continuation of co-pending International No. PCT/SE99/00973 filed on Jun. 7, 1999.

TECHNICAL FIELD

The present invention relates to a flange fixture intended to hold a flange to a tube for welding the flange to said tube.

The object of the present invention is to obtain a flange fixture for eliminating assistance of further working power and thereby eliminating the human fault factor, as well as obtaining a simple and rational handling of the fixation of flanges to a tube, independent of any presence of bends on the intended tube or not.

BACKGROUND OF THE INVENTION

At the welding of flanges onto tubes two men are used today, whereby one holds a flange by means of a gripping tool or by hand to the tube, whereupon the welder applies a number of point welds for fixation of the flange to the tube, whereupon a complete welding takes place along the whole abutment surface. Hereby the problem is to hold the flange in a correct position visavi the tube, on one hand what regards the distance, as distance of one to some millimeters is wanted in connection with the welding, on the other hand what regards the position of pre bored holes of the flange visavi the rotation and future connection of the tube to another flange. Hereby an intended rotation of two tubes in relation to each other be achieved as otherwise a complete mounting of a tube construction can become completely wrong. Further, the joint of the flange perpendicular to the longitudinal axis of the tube difficult to obtain in particular if the tube has not been cut perpendicular to said longitudinal axis, as the eye willingly follows a given line.

Hitherto, there has been no simple and rational construction to solve this problem, a construction which in a simple way can be handled at the individual place of work.

DESCRIPTION OF THE PRESENT INVENTION

It has now surprisingly been shown possible to be able to solve this problem in a simple and rational way by means of the present invention which is characterized in that it comprises a) a cylindrical central body comprising at least three evenly distributed expansion holders as well as one cylindrical part provided with threads, whereby the expansion holders are arranged to receive at least each a radially movable expansion means, and whereby the cylindrical part being provided with threads is arranged to receive one controlling device influencing the radially movable expansion means for obtaining a outwardly directed movement, b) a first cylindrical shaft axially and rotatably mounted arranged in the central body and comprising a second controlling device arranged in the end thereof facing away from the central body, c) an axially and rotatably arranged shaft in said second shaft, which shaft in its end receives at least three evenly distributed second expansion holders, which are arranged to receive at least each one radially movable second expansion means, whereby said second controlling device is arranged to influence said second expansion means for obtaining an outwardly radially directed movement; and d) at least one device for checking the influence of the respective controlling device for radially outwardly directed movement of the respective expansion means.

By means of the present invention it is achieved that a flange can be readily fixed to a tube for subsequent welding of the flange onto the tube, whereby the flange will be correctly positioned in relation to the tube both regarding distance, angle as flange hole relationship.

Further characteristics of the present invention will be apparent from the accompanying claims.

Figure 2:
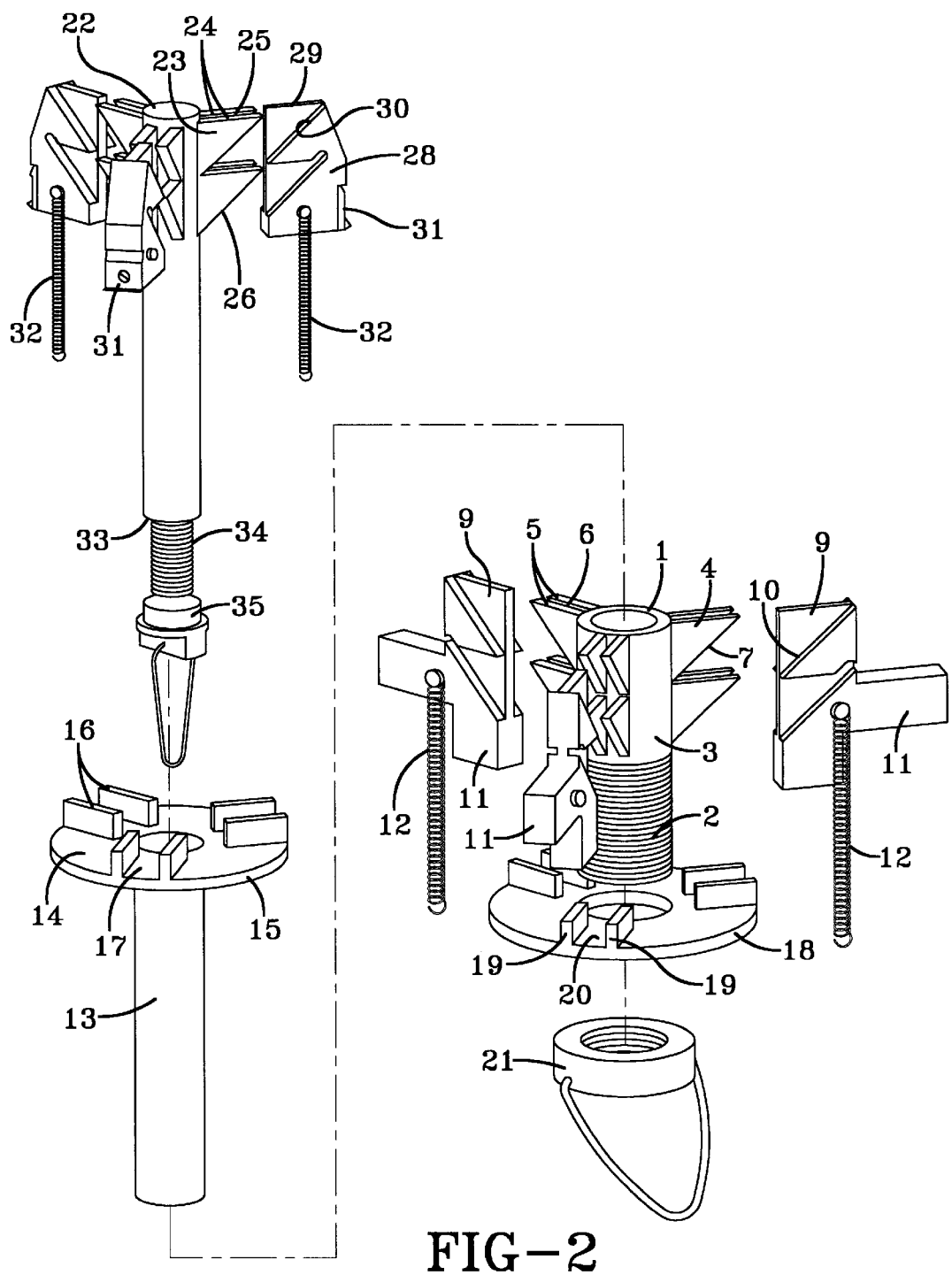

The invention will be described more in detail in the following with reference to some preferred embodying examples, however, without being restricted thereto, with guidance of the attached drawing in which FIG. 1 shows a side view along a fixture according to the present invention;

FIG. 2 shows a side view of the fixture according to FIG. 1 with its respective parts shown.

DETAILED DESCRIPTION OF THE INVENTION 1 denotes a cylindrical central body comprising a threaded part 2 and a non-threaded part 3, which latter received three in pairs arranged expansion holders 4 which are arranged and evenly distributed around the cylinder periphery. The expansion holders 4 consist each of two, in some distance from each other arranged part holders 5 to the formation of a track 6 between said part holders 5. The holders 4 of this embodiment is three sided formed to the formation of inclined, radially outwardly directed sliding planes 7. The sliding planes 7 form an angle of 45° to the longitudinal axis of the cylindrical body 1. In the respective track 6 there are three expansion means 8 arranged, whereby each expansion means 8 consists of a substantially rectangular plate from which at either side two triangular parts are cut to the formation on one hand of guiding plates 9 fitting into the track 6, on the other hand to the formation of two sliding planes 10 arranged on either side and being congruous to the sliding plane 7. From the respective expansion means 8 a supporting means 11 is extended perpendicular. The respective expansion means 8 joined to the central body 1 using a spring, alternatively the springs 12 be joined to the neighbouring expansion means 8. By means of the sliding planes 7 and 10 the expansion means 8 can be moved obliquely radially outwardly. Over the central body 1 a first controlling device 18 is arranged perpendicular to the longitudinal axis of the central body and axially displaceably movably arranged in a part over the threaded part of the central body 1. The controlling device 18 comprises guiding means 19 arranged in pairs along the periphery, which means 19 are placed at a distance from each other to form respective tracks 20. The tracks 20 are arranged to receive respective expansion means 8, whereby the controlling device 18 has the object of pressing the expansion means 8 at an axial displacement along the respective sliding plane 7 and 10 obliquely radially outwardly. To the central body 1, a nut 21 is arranged to influence upon the controlling device 18 via the threaded part, which nut is displaced to and fro along the central body 1 at its rotation.

In the central body 1 a cylindrical shaft 13 is axially and rotatably arranged at the end facing away from the threaded end, on the end of said shaft 13 facing away from the central body a controlling device 14 is fixedly arranged, which controlling device 14 comprises a circular disc 15 being arranged perpendicular to the longitudinal axis of the central body, on which disc guiding means 16 are arranged evenly distributed along the circle periphery in pairs, which means 16 are being placed at a distance from each other to the formation of respective tracks 17 the function of which will be described more in detail in the following, but they coincide with the first controlling device 18.

In the cylindrical shaft 13 there is a further cylindrical or massive shaft 22 being axially and rotatably arranged. The shaft 22 receives in its one end at least three second expansion holders 23 being evenly distributed along the periphery of the shaft 22 comprising two, at some distance from each other arranged part holders 24 to the formation of a track 25 between said part holders 24. The holders 23 of this embodiment are three sided formed to the formation of inclined, radially outwardly directed sliding planes 26. The sliding planes 26 form an angle of 45° to the longitudinal axis of the cylindrical body 1. In the respective track 25 there are three expansion means 28 arranged, whereby each expansion means 28 consists of a substantially rectangular plate from which at either side two triangular parts are cut to the formation on one hand of guiding plates 29 fitting into the track 25, on the other hand to the formation of two sliding planes 30 arranged on either side and being congruous to the sliding plane 26. From the respective expansion means 28 a guiding means 31 is extended perpendicular. The respective expansion means 28 joined to the central body 1 using a spring 32, alternatively the springs 32 be joined to the neighbouring expansion means 28. By means of the sliding planes 26 and 30 the expansion means 28 can be moved obliquely radially outwardly. The shaft 22 running through the shaft 13 and thereby the central body 1 comprises a hole 33 provided with threads on its inside, which hole 33 is arranged to receive a screw 34 the task of which is to be displaced axially to and fro in the shaft 22 at its rotation, whereby the screw 34 contains a counter acting means 35 for abutment against the free end of the shaft 13, whereby when the screw 13 is draught into the shaft 22, the shaft 22 will be drawn towards the second controlling device 14 whereby the expansion means 28 move radially obliquely outwardly.

The expansion means 28 are, in one embodiment, lightly angled or arcuately designed in such a way that the radius over the expansion means 28 are less at the end facing away from the central body 1 than at the end facing the central body 1. Hereby it is obtained that the expansion can be placed into a tube having a bend close to the opening of the tube. The expansion means 28 can of course be designed with equal radius for the introduction into a straight tube.

The sliding planes 7, 10, 26 and 30 are shown having an angle of 45° to the longitudinal axis of the central body 1. This angle can of course be made both greater and smaller depending upon which gearing one wants to obtain at the radial displacement of the expansion holders, as well as what force one wants to apply in order to achieve this displacement. Thus the angle can conveniently be 30 to 60°.

The flange fixture according to the present invention operates in accordance with the following. The shaft 22 with its expansion holders 23 is introduced into the shaft 13 and the expansion holders 28 are fitted into the tracks 25 in the controlling device 14. A flange 42 is brought over the expansion holders 4 and the expansion means 8 of the central body 1, whereby the side of the flange 42 facing away from a tube 41 is allowed to rest upon the support means 11. The flange 42 is fixed to the central body 1 by bringing the first controlling device 18 over the threaded part of the central body 1 and the nut 21 is screwed onto said threaded part. The tracks 20 are fitted into and over the expansion means 8, whereupon the nut 21 is drawn whereby the expansion means 8 will be forced forward axially along the longitudinal axis of the central body 1 and will become displaced obliquely radially outwardly by means of the sliding planes 7 and 10. Hereby the expansion means 8 will be brought into tight and firm abutment to the inner side of the flange 42 and will fix this. Hereupon the now concentric shafts 13 and 22 will be brought into the tube 41 to which the flange 42 will be welded. The screw 34 is introduced into the central body 1 from the end opposite the tube 41 and is screwed into the shaft 22 and drawn, the expansion means 28 being displaced obliquely radially outwardly to a tight abutment to the inner side of the tube 41. In the same way as the expansion means 8 move over the expansion holders 4 the expansion means 28 will move over the second expansion holders 23 and its sliding planes 26, whereby the fixture will be fixed to the tube 41. The guiding means 31 will grip into the edge of the tube 41. By then loosening the nut 21 to some extent the position of the flange 42 be rotated in such a way that optional holes present in the flange 42 will be positioned correctly in relation to its future use, whereby the nut 21 will once again be drawn for the fixation of the flange 42. Depending on the length of the cylindrical part of the flange 42 the central body 1 can be displaced on the shaft 13 in such a way that a suitable distance is achieved between flange 42 and tube 41, whereupon the flange 42 is then fixed to the tube 41 by means of a number of point welds. Hereafter the fixture will be dismantled which is made as a principle in reverse order, and the final welding of the flange to the tube 41 is carried out.

The guiding means 31 can be abandoned whereby the fixture can be used over a greater diameter range with regard to the inner diameter of the tube 41 as the shafts 13 and 22 then can be introduced further into a straight tube. Hereby a greater flexibility is obtained. The tube 41 need be exactly perpendicularly cut as the central body by means of the inner expansion means 28 and their fixation to the tube 41 will take care of that the flange 42 is applied perpendicular to the longitudinal axis of the tube 41. Hereby, it is only a question of filling out the welding joint more or less using a weld string material.

The expansion holders and the expansion means can be present in a number exceeding three whereby the main object is that they are evenly distributed at their respective position in such a way that a correct positioning of a flange contra a tube is obtained, i.e., in particular, that a centring is achieved, as well as a correct adjustment of the angle between flange and tube.

What is claimed is:

1. Flange fixture intended to hold a flange to a tube for welding the flange to said tube, said fixture comprising:
   a) a cylindrical central body comprising at least three evenly distributed expansion holders a cylindrical part provided with threads, said expansion holders being arranged to each receive at least a radially movable expansion device and said cylindrical part being provided with threads and arranged to receive a controlling device influencing the radially movable expansion means for obtaining an outwardly directed movement;
   b) a first cylindrical shaft axially and rotatably mounted and arranged in the central body and comprising a second controlling device arranged in the end thereof facing away from the central body;
   c) an axially and rotatably arranged second shaft in said first cylindrical shaft, said second holders being arranged to receive at least one radially movable second expansion, said second controlling device being arranged to influence said second expansion device for obtaining an outwardly radially directed movement; and
   d) at least one device for checking the influence of the respective controlling device for radially outwardly directed movement of the respective expansion devices.

2. Flange fixture according to claim 1, wherein said expansion devices are bosses obliquely radially movably arranged on the expansion holders.

3. Flange fixture according to claim 2 wherein said resilient devices are springs.

4. Flange fixture according to claim 1, wherein said expansion devices are provided with resilient devices for an inwardly radial movement.

5. Flange fixture according to claim 1, wherein said respective controlling devices are arranged to displace the expansion devices obliquely, radially outwardly on their respective expansion holder.

6. Flange fixture according to claim 1, wherein said respective controlling device is arranged to be displaced axially relative to the central body and the cylindrical shaft, respectively.

7. Flange fixture according to claim 6, wherein said respective controlling devices are arranged to be displaced axially by means of the nut fixture arranged to the threaded part of the central body and a fixation screw being arranged to the shaft.

8. Flange fixture according to claim 1, wherein said second expansion means comprises guiding means for fixation to a tube end edge.

9. Flange fixture according to claim 1, wherein said first expansion means comprises a support member for abutment to a flange.

10. Flange fixture according to claim 1, wherein said second expansion devices are arch formed having a decreasing radius, deriving from the second controlling device, for the second expansion device.

* * * * *